United States Patent
Zhang et al.

(10) Patent No.: US 12,182,646 B2
(45) Date of Patent: Dec. 31, 2024

(54) RADIO FREQUENCY IDENTIFICATION METHOD AND APPARATUS

(71) Applicant: HUAWEI TECHNOLOGIES CO., LTD., Guangdong (CN)

(72) Inventors: Tengyi Zhang, Shenzhen (CN); Shaohua Li, Dongguan (CN); Fanfan Hou, Shenzhen (CN); Lang He, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/326,010

(22) Filed: May 31, 2023

(65) Prior Publication Data

US 2023/0306225 A1    Sep. 28, 2023

Related U.S. Application Data

(63) Continuation of application No. PCT/CN2021/135307, filed on Dec. 3, 2021.

(30) Foreign Application Priority Data

Dec. 7, 2020  (CN) .................. 202011418160.X

(51) Int. Cl.
*G06K 19/06* (2006.01)
*G06K 7/10* (2006.01)
*G06K 19/07* (2006.01)

(52) U.S. Cl.
CPC ..... *G06K 19/0723* (2013.01); *G06K 7/10297* (2013.01)

(58) Field of Classification Search
CPC .......... G06K 19/0723; G06K 19/07749; G06K 19/07; G06K 7/10297; G06K 19/0707; G06K 7/10316

(Continued)

(56) References Cited

U.S. PATENT DOCUMENTS 6,696,879 B1 * 2/2004 O'Toole ............ G06K 19/0716
                                                    327/356
6,836,468 B1 * 12/2004 O'Toole .................. H03L 7/148
                                                    342/51

(Continued)

FOREIGN PATENT DOCUMENTS

| CN | 203894405   | * 10/2014 | ............... G01S 5/02 |
| CN | 203894405 U | 10/2014   |                           |
| CN | 205647629 U | 10/2016   |                           |

*Primary Examiner* — Daniel St Cyr

(57) ABSTRACT

This disclosure provides a radio frequency identification method and system, to improve a radio frequency identification success rate. The method includes: An electronic tag receives an energy signal transmitted by an excitation device via a first frequency band, and receives a control signal transmitted by the excitation device via a second frequency band, where the first frequency band is different from the second frequency band. The electronic tag demodulates the control signal from the second frequency band, and modulates, based on the control signal, description information describing a product to a reflected signal such that the reflected signal is modulated with the description information and has a same frequency band as the first frequency band. The electronic tag transmits the reflected signal to a receiver.

9 Claims, 8 Drawing Sheets

(58) Field of Classification Search
USPC .......................................................... 235/492
See application file for complete search history.

(56) References Cited

U.S. PATENT DOCUMENTS

| | | | |
|---|---|---|---|
| 7,403,122 B1* | 7/2008 | Koepp | G06K 19/0723 340/10.2 |
| 2004/0100834 A1* | 5/2004 | Waters | G06K 19/0723 365/200 |
| 2005/0052283 A1* | 3/2005 | Collins | G06K 19/07767 343/853 |
| 2005/0176373 A1* | 8/2005 | Gilbert | G06K 19/0723 455/39 |
| 2005/0225434 A1* | 10/2005 | Diorio | G06K 19/0723 340/10.2 |
| 2005/0225435 A1* | 10/2005 | Diorio | G06K 19/0723 340/10.5 |
| 2007/0036237 A1* | 2/2007 | Kobayashi | H04B 5/77 375/269 |
| 2008/0111688 A1 | 5/2008 | Nikitin et al. | |
| 2008/0122401 A1* | 5/2008 | Sato | G06K 19/0723 307/149 |
| 2015/0169907 A1 | 6/2015 | Chang et al. | |
| 2016/0365890 A1 | 12/2016 | Reynolds et al. | |

* cited by examiner

RADIO FREQUENCY IDENTIFICATION METHOD AND APPARATUS

CROSS-REFERENCE TO RELATED APPLICATIONS

This application is a continuation of International Application No. PCT/CN2021/135307, filed on Dec. 3, 2021, which claims priority to Chinese Patent Application No. 202011418160.X, filed on Dec. 7, 2020. The disclosures of the aforementioned applications are hereby incorporated by reference in their entireties.

TECHNICAL FIELD

This disclosure relates to the communication field, and in particular, to a radio frequency identification method and an apparatus.

BACKGROUND

A radio frequency identification (radio frequency identification, RFID) technology is an automatic identification technology widely used in daily life, and implements contactless bidirectional data communication in a radio frequency manner. A card reader reads and writes, in a radio frequency manner, a radio frequency identification tag attached to a surface of an object, to identify built-in information of the tag and exchange data, which is highly applied to asset checking and warehouse management scenarios such as retail, clothing, manufacturing, logistics, and the like.

A radio frequency identification system in which transmission and reception are separated includes a receiver (receiver), an excitation device (helper), and an electronic tag. The receiver is responsible for receiving and demodulating a reflected signal sent by the electronic tag, and managing and controlling the excitation device. The excitation device is controlled by the receiver to send an excitation signal to the electronic tag, where the excitation signal includes an excitation energy signal and a control signal. The electronic tag receives the excitation signal, and sends a reflected signal to a receiving unit.

In the conventional technology, an excitation device sends an excitation signal on a frequency band. An electronic tag receives the excitation signal for activation, modulates information about the electronic tag to a reflected signal based on a control signal in the excitation signal, and sends the reflected signal to a receiver. Particularly, in a networking scenario of a plurality of radio frequency identification systems, a control signal in an excitation signal, a reflected signal, and an excitation signal from a neighboring radio frequency identification system are all located on a same frequency band and interfere with each other, resulting in a low identification success rate of an electronic tags and a receiver.

SUMMARY

Embodiments of this disclosure provide a radio frequency identification method and an apparatus, to improve an identification success rate of an electronic tag and a receiver in a radio frequency identification system.

A first aspect of embodiments of this disclosure provides a radio frequency identification method, including: An electronic tag receives an energy signal transmitted by a first excitation device via a first frequency band, and receives a control signal transmitted by the first excitation device via a second frequency band. The first frequency band is different from the second frequency band, the energy signal is for providing excitation energy for the electronic tag, and the excitation energy is for charging the electronic tag. The electronic tag demodulates the control signal from the second frequency band, and modulates, based on the control signal, stored description information for describing a product to a reflected signal. A frequency band of the reflected signal is the same as the first frequency band. The electronic tag transmits the reflected signal modulated with the description information to the receiver.

In this embodiment of this disclosure, the excitation device sends the energy signal and the control signal on two different frequency bands respectively, and the tag can also support a working mode in which the energy signal and the control signal are separated, thereby increasing a demodulation success rate of the receiver and the tag, and improving flexibility in sending the energy signal and the control signal by the excitation device.

In a possible implementation, the electronic tag receives, from at least two control signals transmitted by at least two excitation devices and based on a receiving frequency band of the electronic tag, the control signal that is transmitted by the first excitation device and whose frequency band is the same as the receiving frequency band.

In this embodiment of this disclosure, the tag may determine, based on frequency bands of received control signals, the control signal whose frequency band is the same as the receiving frequency band of the tag, so as to improve a success rate of identifying, by the tag, the control signal sent by the first excitation device.

In a possible implementation, the first frequency band is a legal radio frequency identification frequency band, and the second frequency band is a legal radio frequency identification frequency band or an industrial scientific medical ISM frequency band.

In a possible implementation, the first frequency band includes a radio frequency identification RFID frequency band of 125 KHz, 13.56 MHz, 433 MHz, 800 MHz, 900 MHz, 2.4 GHz, or 5.8 GHz, and the second frequency band includes a frequency band of 125 KHz, 13.56 MHz, 433 MHz, 800 MHz, 900 MHz, 2.4 GHz, or 5.8 GHz.

In this embodiment of this disclosure, the first frequency band and the second frequency band may be a plurality of optional frequency bands, thereby improving reliability of the radio frequency identification method in this embodiment of this disclosure.

A second aspect of embodiments of this disclosure provides a radio frequency identification method, including: A first excitation device receives a scanning signal from a receiver, where the scanning signal instructs to scan an electronic tag. The first excitation device transmits an energy signal to the electronic tag via a first frequency band, and transmits a control signal to the electronic tag via a second frequency band. The first frequency band is different from the second frequency band, the energy signal is for providing excitation energy for the electronic tag, the excitation energy is for charging the electronic tag, the control signal is used for the electronic tag to modulate description information for describing a product to a reflected signal, and the reflected signal is transmitted by the electronic tag to the receiver.

In this embodiment of this disclosure, the excitation device respectively sends the energy signal and the control signal via two different frequency bands. Because the energy signal and the control signal are sent via different frequency bands, flexibility in sending the energy signal and the control signal by the excitation device is improved, and a demodulation success rate of the receiver, the electronic tag, and the excitation device is improved.

In a possible implementation, a waveform of the energy signal is different from that of the reflected signal.

In a possible implementation, the waveform of the energy signal is a square wave, a triangular wave, or a sine wave, and an amplitude and a phase of the waveform of the energy signal are different from those of the waveform of the reflected signal.

In this embodiment of this disclosure, the waveform of the energy signal is specifically designed, and the waveform of the energy signal is different from that of the reflected signal. In this way, the receiver can accurately distinguish between the energy signal and the reflected signal sent by the tag, and can eliminate the energy signal by using a cancellation algorithm based on the waveform of the energy signal, thereby improving a success rate of demodulating the reflected signal by the receiver.

In a possible implementation, the first frequency band includes a radio frequency identification RFID frequency band of 125 KHz, 13.56 MHz, 433 MHz, 800 MHz, 900 MHz, 2.4 GHz, or 5.8 GHz, and the second frequency band includes a frequency band of 125 KHz, 13.56 MHz, 433 MHz, 800 MHz, 900 MHz, 2.4 GHz, or 5.8 GHz.

A third aspect of embodiments of this disclosure provides a radio frequency identification method, including: A receiver sends a scanning signal to a first excitation device, where the scanning signal instructs to scan an electronic tag. The receiver receives a reflected signal from the electronic tag, where the reflected signal includes description information that is for describing a product and that is modulated by the electronic tag based on a control signal. The electronic tag is charged by using excitation energy provided by an energy signal transmitted by the first excitation device via a first frequency band, where the control signal is transmitted by the first excitation device to the electronic tag via a second frequency band.

In this embodiment of this disclosure, the reflected signal received by the receiver is modulated by the electronic tag based on the control signal, and the control signal and the energy signal are respectively sent by the excitation device via two different frequency bands, thereby improving a demodulation success rate of the receiver.

In a possible implementation, the receiver identifies the reflected signal from a plurality of signals of a same frequency band based on waveforms, where the plurality of signals of a same frequency band include the energy signal transmitted by the first excitation device, and the energy signal and reflected signal have a same frequency band but different waveforms.

In this embodiment of this disclosure, the waveform of the energy signal is different from that of the reflected signal. In this way, the receiver can accurately distinguish between the energy signal and the reflected signal sent by the electronic tag, and can eliminate the energy signal by using a cancellation algorithm based on the waveform of the energy signal, thereby improving a success rate of demodulating the reflected signal by the receiver.

A fourth aspect of embodiments of this disclosure provides an electronic tag, including:
  a receiving unit, configured to receive an energy signal transmitted by a first excitation device via a first frequency band, and receive a control signal transmitted by the first excitation device via a second frequency band, where the first frequency band is different from the second frequency band, the energy signal is for providing excitation energy for the electronic tag, and the excitation energy is for charging the electronic tag;
  a processing unit, configured to demodulate the control signal from the second frequency band, and modulate, based on the control signal, stored description information for describing a product to a reflected signal, where a frequency band of the reflected signal is the same as the first frequency band; and
  a sending unit, configured to transmit the reflected signal modulated with the description information to a receiver.

In a possible implementation, the receiving unit is further configured to:
  receive, from at least two control signals transmitted by at least two excitation devices and based on a receiving frequency band of the receiving unit, the control signal that is transmitted by the first excitation device and whose frequency band is the same as the receiving frequency band.

In a possible implementation, the first frequency band includes a radio frequency identification RFID frequency band of 125 KHz, 13.56 MHz, 433 MHz, 800 MHz, 900 MHz, 2.4 GHz, or 5.8 GHz, and the second frequency band includes a frequency band of 125 KHz, 13.56 MHz, 433 MHz, 800 MHz, 900 MHz, 2.4 GHz, or 5.8 GHz.

A fifth aspect of embodiments of this disclosure provides an excitation apparatus, including:
  a receiving unit, configured to receive a scanning signal from a receiver, where the scanning signal instructs to scan an electronic tag; and
  a sending unit, configured to transmit an energy signal to the electronic tag via a first frequency band, and transmit a control signal to the electronic tag via a second frequency band, where the first frequency band is different from the second frequency band, the energy signal is for providing excitation energy for the electronic tag, the excitation energy is for charging the electronic tag, the control signal is used for the electronic tag to modulate description information for describing a product to a reflected signal, and the reflected signal is transmitted by the electronic tag to the receiver.

In a possible implementation, a waveform of the energy signal is different from that of the reflected signal.

In a possible implementation, the first frequency band includes a radio frequency identification RFID frequency band of 125 KHz, 13.56 MHz, 433 MHz, 800 MHz, 900 MHz, 2.4 GHz, or 5.8 GHz, and the second frequency band includes a frequency band of 125 KHz, 13.56 MHz, 433 MHz, 800 MHz, 900 MHz, 2.4 GHz, or 5.8 GHz.

A sixth aspect of embodiments of this application provides a receiving apparatus, including:
  a sending unit, configured to send a scanning signal to a first excitation device, where the scanning signal instructs to scan an electronic tag; and
  a receiving unit, configured to receive a reflected signal from the electronic tag, where the reflected signal includes description information that is for describing a product and that is modulated by the electronic tag based on a control signal, the electronic tag is charged by using excitation energy provided by an energy signal transmitted by the first excitation device via a first frequency band, and the control signal is transmitted by the first excitation device to the electronic tag via a second frequency band.

In a possible implementation, the receiver further includes a processing unit, and the processing unit is configured to:
identify the reflected signal from a plurality of signals of a same frequency band based on waveforms, where the plurality of signals of a same frequency band include the energy signal transmitted by the first excitation device, and the energy signal and the reflected signal have a same frequency band but different waveforms.

A seventh aspect of embodiments of this disclosure provides a radio frequency identification system. The radio frequency identification system includes an excitation device, a receiver, and a tag. The excitation device is configured to perform the method according to the second aspect, the receiver is configured to perform the method according to the third aspect, and the tag is configured to perform the method according to the first aspect.

An eighth aspect of embodiments of this disclosure provides a digital processing chip. The chip includes a processor and a memory, and the memory and the processor are interconnected by using a line. The memory stores instructions, and the processor is configured to perform the method according to any one of the first aspect to the third aspect.

A ninth aspect of embodiments of this application provides a computer-readable storage medium. The computer-readable storage medium stores a program, and when executing the program, a computer performs the method according to any one of the first aspect to the third aspect.

A tenth aspect of embodiments of this disclosure provides a computer program product. When the computer program product is executed on a computer, the computer performs the method according to any one of the first aspect to the third aspect.

DESCRIPTION OF EMBODIMENTS

Figure 1A:
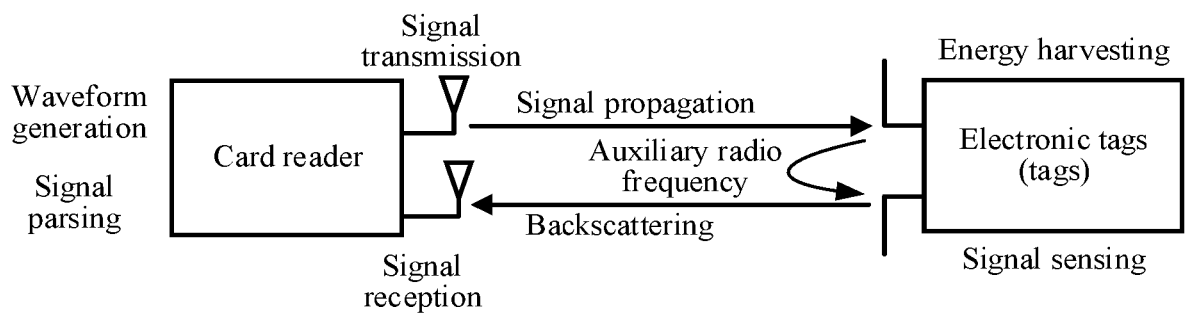
FIG. 1a is a schematic diagram of a structure of a radio frequency identification system according to an embodiment of this disclosure.

The following clearly and completely describes the technical solutions in embodiments of this disclosure with reference to the accompanying drawings in embodiments of this disclosure. It is clear that the described embodiments are merely some but not all of embodiments of this disclosure.

In the specification, claims, and accompanying drawings of this disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In embodiments of this disclosure, the term such as "exemplary" or "for example" is used to represent giving an example, an illustration, or a description. Any embodiment or design scheme described by using "exemplary" or "for example" in embodiments of this disclosure should not be explained as being more preferred or having more advantages than another embodiment or design scheme. Exactly, use of the term such as "exemplary" or "for example" is intended to present a relative concept in a specific manner.

In the following, some terms in this disclosure are described, so as to help a person skilled in the art have a better understanding.

Radio frequency identification is a widely applied automatic identification technology. The principle of the technology is to implement data communication between a card reader and a tag through a radio wave in a contactless manner, to identify a target. In a separate radio frequency identification technology, the card reader is separated into a receiver and an excitation device. The radio frequency identification technology has a wide range of application scenarios, and may be deployed in a plurality of scenarios such as warehousing, logistics, manufacturing, retail, and asset management, for example, an animal chip, an automobile chip anti-theft device, access control, parking lot control, production line automation, and material management.

A tag, also referred to as a radio frequency identification tag or an electronic tag, consists of a coupling element and a chip, and is generally attached to an object to identify a target object. From a perspective of tag attributes, tags can be classified into active tags and passive tags. The active tag actively transmits information by using a battery carried by the active tag. The passive tag does not have a battery. A card reader needs to transmit an energy signal to excite the tag.

The tag reflects a signal carrying information, and then the card reader receives and demodulates the signal.

FIG. 1a is a schematic architectural diagram of a centralized radio frequency identification system according to an embodiment of this disclosure. The radio frequency identification system includes a card reader and tags (tags). The card reader has both transmitting and receiving capabilities. The card reader generates a signal waveform and transmits a signal through an antenna. The signal is referred to as an excitation signal, and the excitation signal travels to the tag through an air interface. If the excitation signal is greater than an excitation threshold of the tag, the tag is excited. The tag backscatters a signal to the card reader through energy harvesting, auxiliary radio frequency, and signal sensing. The signal is a reflected signal, and the card reader receives the reflected signal and demodulates valid information in the reflected signal.

Figure 1B:
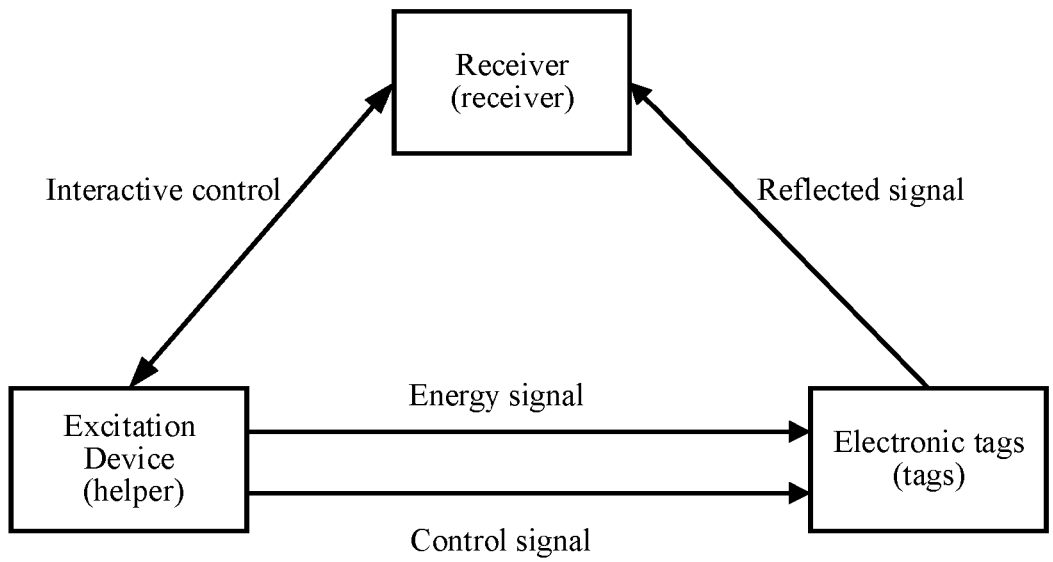
FIG. 1B is a schematic diagram of a structure of another radio frequency identification system according to an embodiment of this disclosure.

FIG. 1B is a schematic architectural diagram of a separate radio frequency identification system according to an embodiment of this disclosure. The radio frequency identification system includes a receiver (receiver), an excitation device (helper), and tags (tags).

In this embodiment of this disclosure, the receiver is configured to receive a reflected signal sent by the tag and demodulate the reflected signal to obtain valid information of the tag carried in the reflected signal, and the receiver is further configured to manage and control the excitation device. The receiver has an algorithm for scheduling the excitation device, an algorithm for canceling interference from an energy signal of the excitation device, and an algorithm for demodulating the reflected signal of the tag.

In this embodiment of this disclosure, the excitation device is controlled by a coordination instruction sent by the receiver, and sends an energy signal and a control signal to the tag. The energy signal is for providing excitation energy for the tag to activate the tag, and does not carry valid information. The control signal indicates a tag behavior and carries valid information. The energy signal and the excitation signal are respectively carried on different frequency bands for sending, and the excitation device supports at least two operating frequency bands and has at least two transmit channels.

In this embodiment of this disclosure, the tag is configured to receive the energy signal and the control signal that are sent by the excitation device, demodulate the control signal, include and modulate the validity information of the tag in a reflected signal, and send the reflected signal to the receiver.

In the separate radio frequency identification system, a signal sending unit and a signal receiving unit in the card reader are separated in space, and are respectively an excitation device and a receiver. Because of the improvement in a space isolation degree, the receiver can be far away from the tag, thereby greatly extending an actual reading distance, and enabling application scenarios of automatic checking and automatic inbound and outbound management.

The following describes a radio frequency identification method in embodiments of this disclosure by using the separate radio frequency identification system as an example. It may be understood that the separate radio frequency identification system is only used as an application scenario in embodiments of this disclosure, and the radio frequency identification method provided in embodiments of this disclosure may also be applied to the centralized radio frequency identification system.

Figure 2:
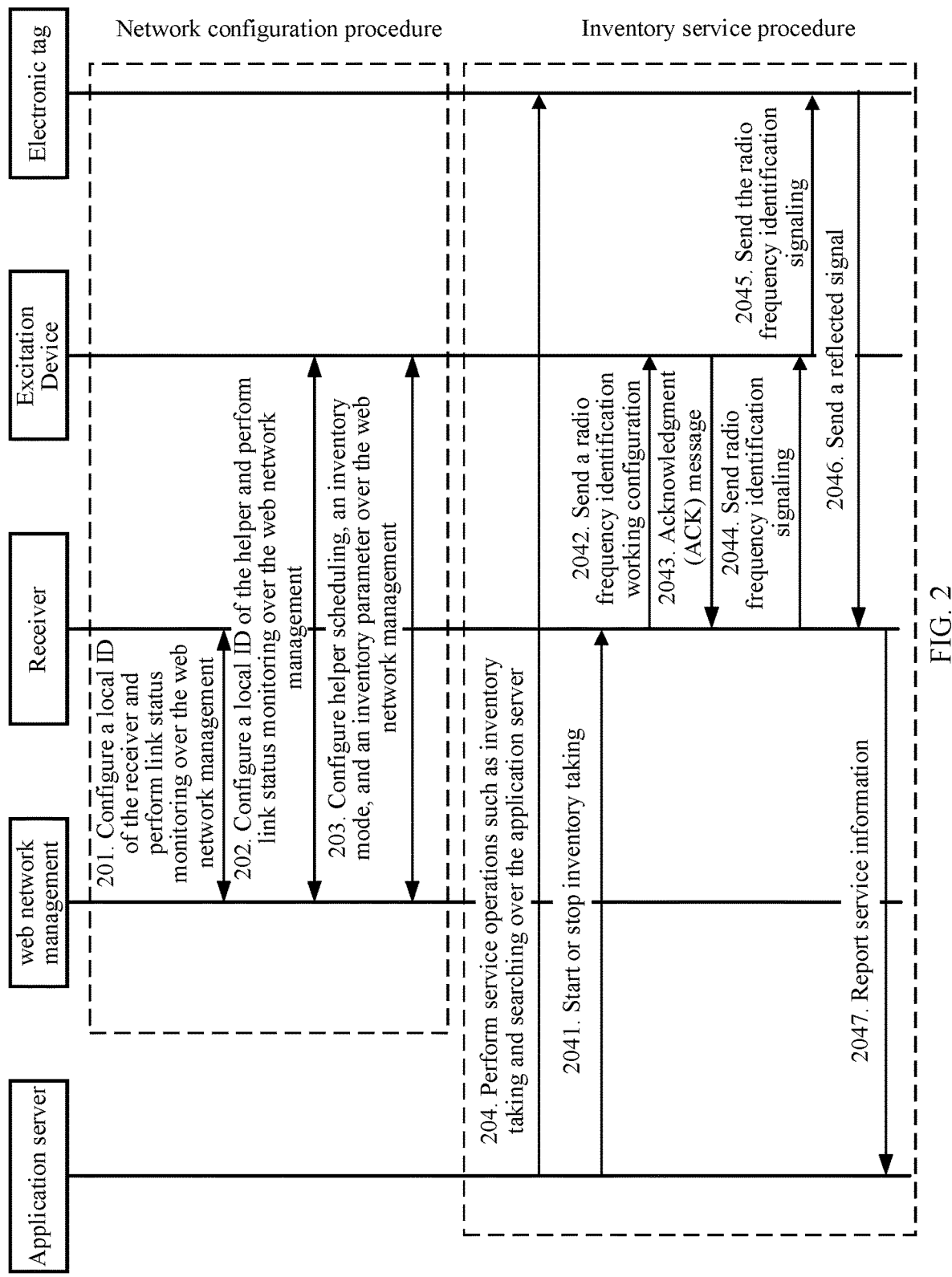
FIG. 2 is a schematic diagram of a radio frequency identification method according to an embodiment of this disclosure.

The radio frequency identification method provided in embodiments of this disclosure may be applied to a plurality of scenarios such as warehousing, logistics, manufacturing, retail, and asset management. The following uses an inventory service as an example for description. FIG. 2 is a flowchart of completing an inventory service by a radio frequency identification system according to an embodiment of this disclosure. The method includes but is not limited to the following steps.

The following step 201 to step 203 are network configuration steps performed before the inventory service, and the network configuration steps before the inventory service procedure include:

201. Configure a local ID of the receiver and perform link status monitoring over web network management.

The web network management seeks to establish a connection with the receiver based on an ID registered by the receiver. After the connection is successfully established between the web network management and the receiver, the receiver returns a connection status to the web network management, and sends a master information block (master information block, MIB) to the excitation device. The master information block includes information such as a valid physical carrier bitmap and frequency hopping.

202. Configure a local ID of the excitation device and perform link status monitoring over the web network management.

The web network management sends local ID allocation configuration information to the receiver based on a global ID. After receiving the configuration information, the receiver sends a paging (paging) message to the excitation device, where the paging message includes the global ID and the local ID. After the excitation device receives the paging message, the excitation device returns an acknowledgment (acknowledgment, ACK) message about success reception to the receiver. After receiving the acknowledgment message from the excitation device, the receiver returns a response message to the web network management.

203. Configure excitation device scheduling, an inventory mode, and an inventory parameter over the web network management.

The web network management sends a configuration message to the receiver, where the configuration information is for configuring the excitation device scheduling, the inventory mode, the inventory parameter, and the like. The receiver sends a management configuration message to the excitation device, where the management configuration message includes a local ID and a radio frequency identification DL frequency. After successfully receiving the management configuration message, the excitation device returns an acknowledgment message to the receiver. After receiving the acknowledgment message from the excitation device, the receiver returns a response message to the web network management.

204. Perform an inventory service operation over an application server.

Step 204 is an inventory service procedure, and the inventory service procedure step 204 includes:

2041. The application server starts the inventory service.

Through the network configuration procedure in step 201 to step 203, after the receiver establishes a network connection with the excitation device, the application server starts the inventory service. Specifically, the application server sends an inventory service starting message to the receiver.

2042. The receiver sends a radio frequency identification working configuration message to the excitation device.

After the receiver receives the inventory service starting message sent by the application server, the receiver sends the radio frequency identification working configuration message to the excitation device.

2043. The excitation device returns an acknowledgment message to the receiver.

After receiving the radio frequency identification working configuration message, the excitation device sends the acknowledgment message to the receiver.

2044. The receiver sends radio frequency identification signaling to the excitation device.

The receiver sends the radio frequency identification signaling to the excitation device, where the radio frequency identification signaling is for coordinating and scheduling the excitation device.

2045. The excitation device forwards the radio frequency identification signaling to the tag.

The excitation device is controlled by the radio frequency identification signaling, and sends the radio frequency identification signaling to the tag, where the radio frequency identification signaling is for exciting the tag.

2046. The tag sends a reflected signal to the receiver.

The tag receives the radio frequency identification signal and modulates the reflected signal based on the radio frequency identification signal and the reflected signal includes valid information of the tag. The tag sends the reflected signal to the receiver.

2047. The receiver reports service information to the application server.

After the receiver receives the reflected signal sent by the tag, the receiver demodulates the reflected signal and sends a service information report message to the application server.

Figure 3:
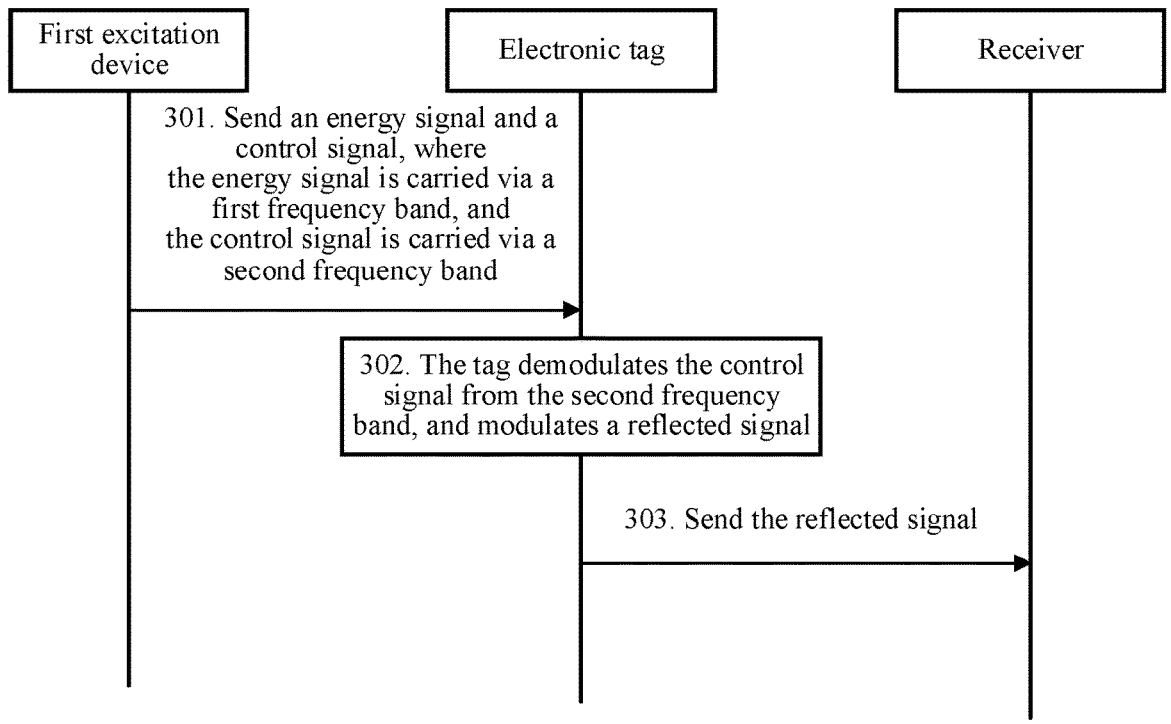
FIG. 3 is a schematic diagram of another radio frequency identification method according to an embodiment of this disclosure.

FIG. 3 is a schematic diagram of an embodiment of a radio frequency identification method according to an embodiment of this disclosure. The method includes but is not limited to the following steps.

301. A first excitation device sends an energy signal and a control signal, and a tag receives the energy signal sent by the first excitation device, where the energy signal is carried via a first frequency band, the control signal is carried via a second frequency band, and the first frequency band and the second frequency band are different frequency bands.

The first excitation device sends the energy signal and the control signal, and the tag receives the energy signal transmitted by the first excitation device via the first frequency band, and receives the control signal transmitted by the first excitation device via the second frequency band. The first frequency band is different from the second frequency band. The energy signal is for providing excitation energy for the electronic tag, and the excitation energy is for charging the electronic tag. It may be understood that the energy signal carries valid information and is for charging a capacitor in the tag.

In this embodiment of this application, a waveform of the energy signal is a specifically designed waveform, and may be of a plurality of types, for example, may be a square wave, a triangular wave, a single tone signal, a multi-tone signal, or signals of different phases. This is not specifically limited.

In this embodiment of this disclosure, the first frequency band is a legal frequency band of radio frequency identification, and the second frequency band is a radio frequency identification FRID or industrial scientific medical ISM frequency band.

For example, the first frequency band may be 125 KHz, 13.56 MHz, 433 MHz, 800 MHz, 900 MHz, 2.4 GHz, or 5.8 GHz. This is not specifically limited. The second frequency band may be 125 KHz, 13.56 MHz, 433 MHz, 800 MHz, 900 MHz, 2.4 GHz, or 5.8 GHz. This is not specifically limited.

302. The tag demodulates the control signal from the second frequency band, and modulates a reflected signal.

The tag demodulates the control signal from the second frequency band, and modulates, to the reflected signal based on the control signal, description information that is for describing a product and that is stored on the tag. The description information for describing a product is valid information of the tag, and a frequency band of the reflected signal is the same as the first frequency band.

303. The tag transmits the reflected signal modulated with the description information to a receiver.

The tag sends the reflected signal to the receiver, and the reflected signal and the energy signal have a same frequency band. After receiving the reflected signal sent by the tag, the receiver demodulates the reflected signal to obtain the description information of the tag.

In this embodiment of this disclosure, when the tag receives the control signal sent by the excitation device, the tag may be interfered with by a control signal sent by another excitation device. As a result, the tag cannot identify a to-be-received target control signal. The following describes, with reference to FIG. 4 and FIG. 5, a radio frequency identification method provided in embodiments of this disclosure. The method is used for a tag to identify a target control signal.

Figure 4:
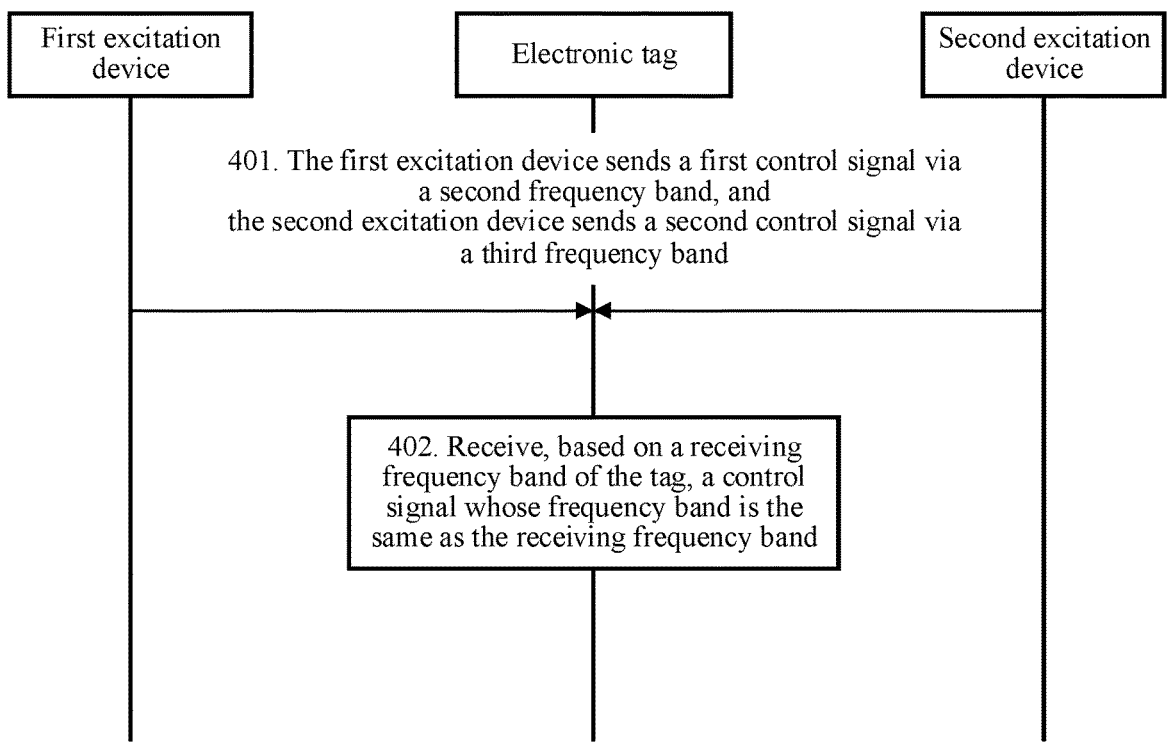
FIG. 4 is a schematic diagram of another radio frequency identification method according to an embodiment of this disclosure.

FIG. 4 is a schematic diagram of a radio frequency identification method according to an embodiment of this disclosure. The method includes but is not limited to the following steps.

401. A first excitation device sends a first control signal via a second frequency band, and a second excitation device sends a second control signal via a third frequency band.

The first excitation device sends the first control signal, and the first control signal is carried via the second frequency band. The second excitation device sends the second control signal, and the second control signal is carried via the third frequency band. The first excitation device and the second excitation device are excitation devices in a neighboring radio frequency identification system, and the second frequency band and the third frequency band are different frequency bands.

In this embodiment of this disclosure, the second frequency band and the third frequency band may be legal radio frequency identification frequency bands or industrial scientific medical ISM frequency bands. For example, the second frequency band may be 125 KHz, 13.56 MHz, 433 MHz, 800 MHz, 900 MHz, 2.4 GHz, or 5.8 GHz. This is not limited. The third frequency band may be 125 KHz, 13.56 MHz, 433 MHz, 800 MHz, 900 MHz, 2.4 GHz, or 5.8 GHz. This is not specifically limited.

In this embodiment of this disclosure, the second excitation device may be one excitation device, or may be a plurality of excitation devices. This is not limited. The second control signal may be one control signal, or may be a plurality of control signals. This is not limited. It may be understood that when the second control signal is a plurality of signals, the second control signals may be from a same excitation device, or may be from different excitation devices. This is not limited.

In this embodiment of this disclosure, step 401 is an optional step, and may be performed or not performed. This is not limited.

402. A tag determines, based on a receiving frequency band of the tag, a control signal that is sent by the first excitation device and whose frequency band is the same as the receiving frequency band of the tag.

The tag receives, from at least two control signals sent by at least two excitation devices and based on the receiving frequency band of the tag, the control signal that is sent by the first excitation device and whose frequency band is the same as the receiving frequency band of the tag.

It may be understood that, in a networking scenario of a plurality of radio frequency identification systems, the tag may receive control signals sent by excitation devices from different radio frequency identification systems. Control signals sent by different excitation devices are carried via different frequency bands, and the tag receives, from a plurality of control signals, a control signal whose frequency band is the same as the receiving frequency band of the tag. Correspondingly, control signals whose frequency bands are different from the receiving frequency band of the tag are irrelevant signals for the tag.

In this embodiment of this disclosure, before the tag receives the control signal, the tag receives an energy signal sent by the first excitation device. The energy signal is carried via a first frequency band, and the first frequency band and the second frequency band are different frequency bands. After the tag receives the energy signal carried via the first frequency band, the tag is activated based on the energy signal.

After receiving the first control signal, the tag demodulates the control signal, and modulates, to a reflected signal, description information that is for describing a product and that is stored on the tag, where the description information is valid information of the tag. The tag sends the reflected signal, and a receiver receives the reflected signal.

Figure 5:
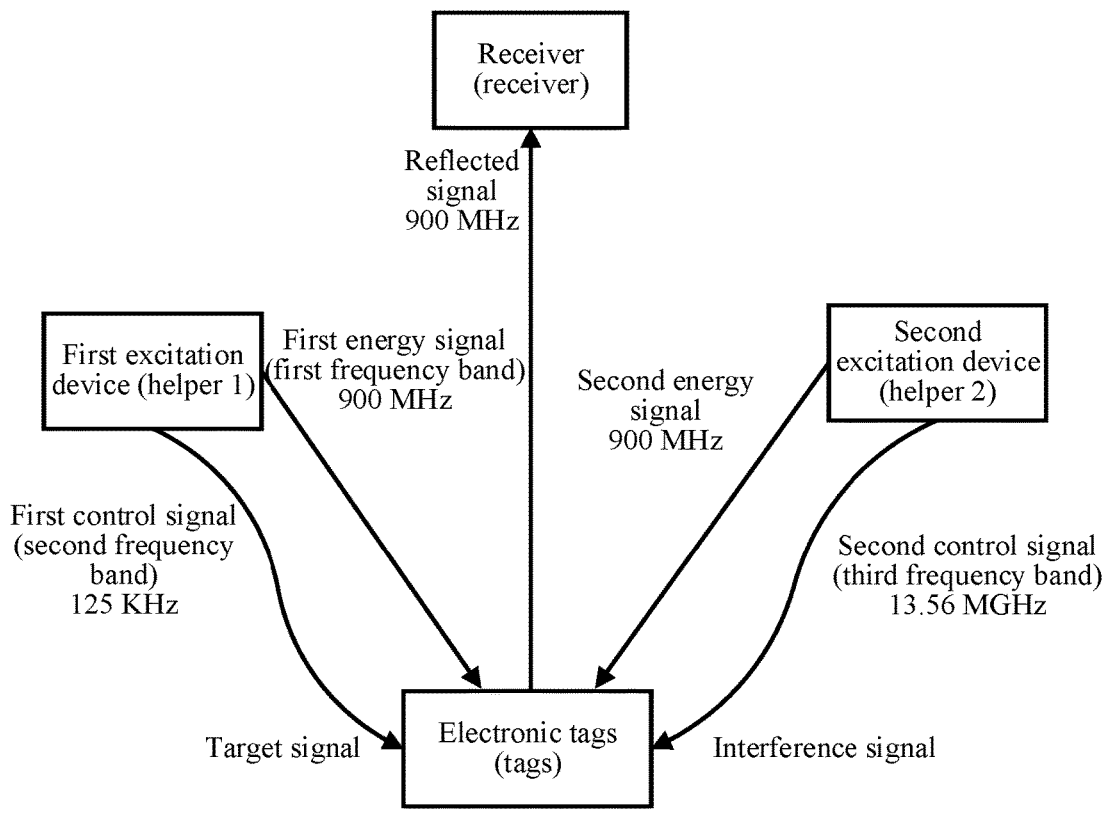
FIG. 5 is a schematic diagram of another radio frequency identification method according to an embodiment of this disclosure.

With reference to FIG. 5, the following describes the radio frequency identification method provided in this embodiment. The first excitation device sends a first energy signal to the tag via a 900 MHz legal frequency band, and the energy signal is for providing excitation energy for the tag and does not carry valid information. The first excitation device sends a first control signal via a 125 KHz frequency band. If a frequency band of the first control signal is the same as the receiving frequency band of the tag, the first control signal is a target signal to be demodulated by the tag. The tag may receive, from at least two control signals sent by at least two excitation devices, a control signal whose frequency band is the same as the receiving frequency band of the tag. For example, the tag receives, from a first control signal sent by the first excitation device and a second control signal sent by the second excitation device, a control signal whose frequency band is the same as the receiving frequency band of the tag. A frequency band of the first control signal is 125 KHz, and a frequency band of the second control signal is 13.56 MHz. Because the frequency band of the first control signal is the same as the receiving frequency band of the tag, the tag receives the first control signal sent by the first excitation device. The frequency band of the second control signal is different from the receiving frequency band of the tag, and for the tag, the second control signal is an irrelevant signal.

In the embodiment shown in FIG. 5, after the tag receives the first energy signal, a capacitor in the tag is charged, and a chip in the tag is activated. The chip in the tag demodulates the first control signal, adjusts a working parameter based on the target signal, and modulates tag information in a reflected signal. The tag information is description information for describing a product, and the reflected signal is sent to the receiver via a 900 MHz frequency band.

In this embodiment of this disclosure, the first frequency band is a legal radio frequency identification frequency band, and the second frequency band may be a legal radio frequency identification frequency band or an industrial scientific medical ISM frequency band. For example, the first frequency band may be 125 KHz, 13.56 MHz, 433 MHz, 800 MHz, 900 MHz, 2.4 GHz, or 5.8 GHz. This is not specifically limited. The second frequency band may be 125 KHz, 13.56 MHz, 433 MHz, 800 MHz, 900 MHz, 2.4 GHz, or 5.8 GHz. This is not specifically limited.

In the radio frequency identification method provided in this embodiment of this disclosure, the excitation device separates the control signal and the energy signal and sends the control signal and the energy signal via different frequency bands, and different excitation devices also send control signals via different frequency bands. The tag may receive a control signal of a particular target frequency band, so that the tag identifies the target signal based on frequency bands of different control signals, thereby eliminating interference between a plurality of neighboring separate radio frequency identification systems.

In this embodiment of this disclosure, when the receiver receives the reflected signal sent by the tag, because the reflected signal and the energy signal sent by the excitation device have a same frequency band, the receiver may be interfered with by an energy signal sent by an excitation device of a same system or an excitation device of another neighboring system. Consequently, the receiver cannot identify the reflected signal sent by the tag. The following describes a radio frequency identification method provided in embodiments of this disclosure with reference to FIG. 6 to FIG. 7. The method is used for a receiver to identify a reflected signal.

Figure 6:
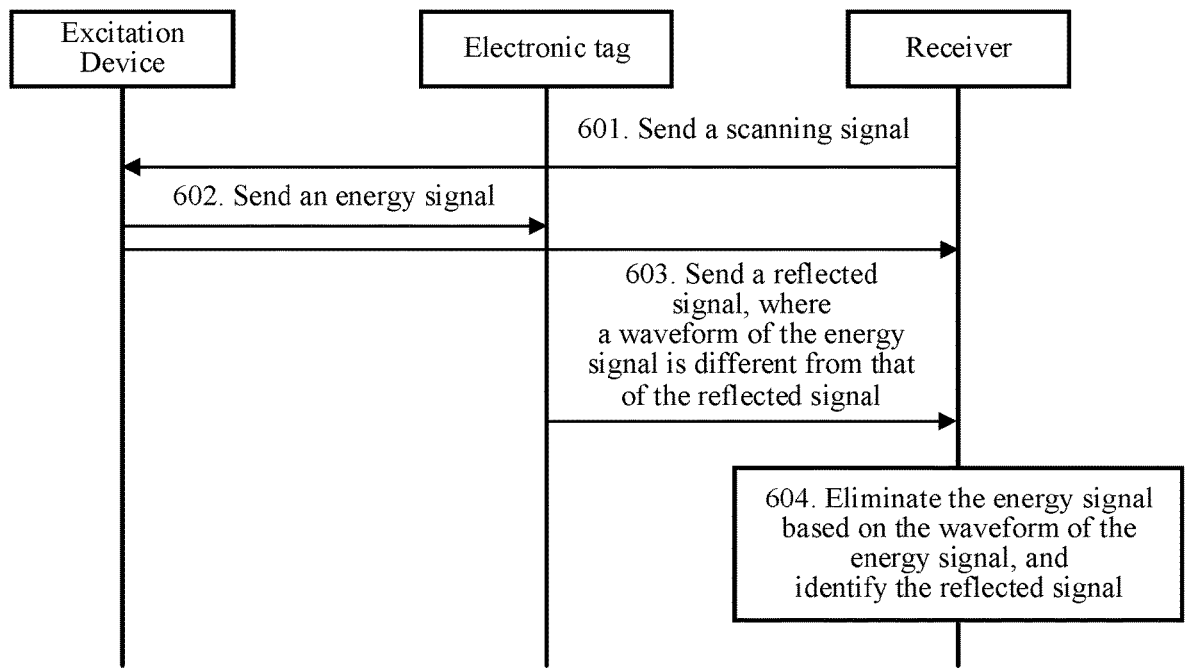
FIG. 6 is a schematic diagram of another radio frequency identification method according to an embodiment of this disclosure.

FIG. 6 is a schematic diagram of another embodiment of a radio frequency identification method according to an embodiment of this disclosure. The method includes but is not limited to the following steps.

601. A receiver sends a scanning signal, and a first excitation device receives the scanning signal.

The receiver sends the scanning signal to the first excitation device, and the first excitation device receives the scanning signal sent by the receiver. Specifically, before the receiver sends the scanning signal, the receiver receives a request message of an upper-layer application platform, and the receiver sends the scanning signal to the first excitation device, where the scanning signal includes a control command for controlling the first excitation device.

602. The first excitation device sends an energy signal.

The first excitation device sends the energy signal, and the energy signal and a reflected signal sent by a tag have a same frequency band. The energy signal may interfere with sending of the reflected signal by the tag to the receiver, and the reflected signal includes valid information sent by the tag to the receiver. The tag is further configured to receive the energy signal and a control signal. The energy signal is carried via a first frequency band, and the energy signal may be for activating a corresponding tag. The control signal is carried via a second frequency band, and the first frequency band and the second frequency band are two different frequency bands.

In this embodiment of this disclosure, the energy signal received by the receiver and the reflected signal sent by the tag to the receiver have a same frequency band. The energy signal is an interference signal for the receiver. The energy signal may be sent by an excitation device in a radio frequency identification system to which the receiver belongs, or may be sent by an excitation device in a neighboring radio frequency identification system. This is not specifically limited.

603. The tag sends the reflected signal, where a waveform of the reflected signal is different from that of the energy signal.

After the tag receives the energy signal, the tag is activated based on the energy signal. After the tag receives the control signal, the tag demodulates the control signal, and modulates the reflected signal, where the reflected signal includes valid information in the tag. The tag sends the reflected signal to the receiver. The waveform of the energy signal is a specifically designed waveform, and the waveform of the energy signal is different from that of the reflected signal.

In this embodiment of this disclosure, the waveform of the energy signal may be designed into a plurality of forms, for example, a square wave, a triangular wave, a single tone signal, a multi-tone signal, or signals of different phases. This is not specifically limited.

604. The receiver eliminates the energy signal based on the waveform of the energy signal, and identifies the reflected signal.

The receiver eliminates the energy signal based on the waveform of the energy signal, so that the receiver can identify the reflected signal sent by the tag, where the reflected signal carries the valid information of the tag. Specifically, the receiver uses a cancellation algorithm based on the waveform of the energy signal, and demodulates the reflected signal sent by the tag after the energy signal is eliminated, to obtain tag information.

In this embodiment of this disclosure, the waveform of the energy signal sent by the excitation device is a specifically designed waveform, and the receiver may eliminate the energy signal based on the waveform of the energy signal, so that the receiver can distinguish between the energy signal and the reflected signal.

Figure 7:
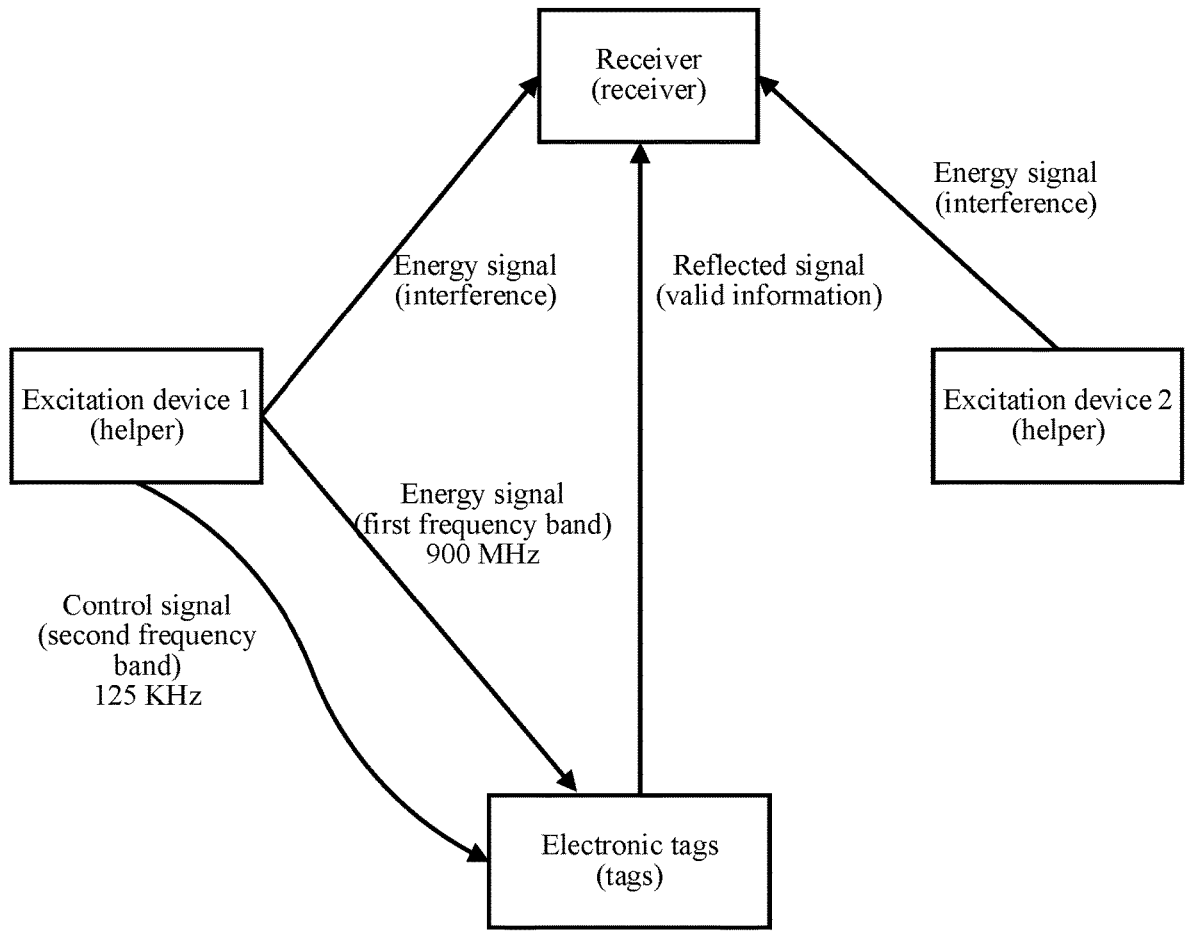
FIG. 7 is a schematic diagram of another radio frequency identification method according to an embodiment of this disclosure.

The radio frequency identification method provided in this embodiment of this disclosure is described below with reference to FIG. 7. The receiver may receive an energy signal sent by an excitation device. The energy signal may be sent by an excitation device 1 in a radio frequency identification system to which the receiver belongs, or may be sent by an excitation device 2 in another radio frequency identification system. Because the energy signal and the reflected signal sent by the tag have a same frequency band, the energy signal is an interference signal for the receiver. As shown in FIG. 7, the energy signal received by the tag is sent via a 900 MHz frequency band, and a frequency band of the reflected signal modulated by the tag is also 900 MHz. The frequency band of the energy signal is the same as that of the reflected signal, and the energy signal is an interference signal for the receiver. In this embodiment of this disclosure, waveforms of energy signals sent by the excitation device 1 and the excitation device 2 are specially designed, and the receiver can eliminate the energy signals based on the waveforms of the energy signals, to identify the reflected signal. For example, the waveform of the energy signal is a square wave. After receiving the energy signal, the receiver selects a cancellation algorithm corresponding to the square wave to eliminate the energy signal, to demodulate the reflected signal sent by the tag and obtain the valid information in the reflected signal.

Figure 8:
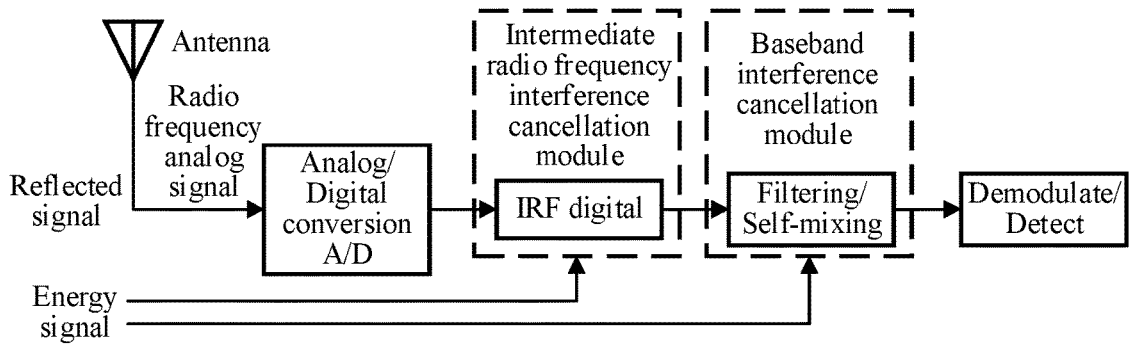
FIG. 8 is a schematic diagram of another radio frequency identification method according to an embodiment of this disclosure.

FIG. 8 shows a process in which the receiver eliminates an energy signal based on a waveform of the energy signal and identifies a reflected signal. The receiver receives, from an antenna, a reflected signal sent by the tag, and the reflected signal is an analog signal. The receiver obtains a digital signal after conversion by using an analog-to-digital converter. The digital signal passes through an intermediate radio frequency interference cancellation module and a baseband interference cancellation module in sequence to eliminate interference from the energy signal. Specifically, the energy signal is another input to the two modules, and are eliminated by using a cancellation algorithm such as self-mixing.

In this embodiment of this disclosure, an amplitude and a phase of the waveform of the energy signal may be specifically designed. For example, the waveform of the energy signal may be a waveform such as a square wave, a triangular wave, or a sine wave. Further, energy signals may be waveforms of different amplitudes and phases, thereby improving performance of the cancellation modules.

In this embodiment of this disclosure, the waveform of the energy signal is specifically designed, so that the receiver can accurately distinguish the energy signal from the reflected signal sent by the tag, and can use a cancellation algorithm to eliminate the energy signal based on the waveform of the energy signal, thereby improving a success rate of demodulating the reflected signal by the receiver.

In this embodiment of this disclosure, the excitation device respectively sends the energy signal and the control signal via two different frequency bands. Correspondingly, the tag can also support a working mode in which the energy signal and the control signal are separated. A design of a chip circuit in the tag can also support dual-band working. The energy signal and the control signal are sent via different frequency bands, thereby increasing a demodulation success rate of the receiver and the tag, and improving flexibility in sending the energy signal and the control signal by the excitation device.

Further, in this embodiment of this disclosure, the waveform of the energy signal is specifically designed, so that the receiver can accurately distinguish between the energy signal and the reflected signal sent by the tag, and can eliminate the energy signal by using a cancellation algorithm based on the waveform of the energy signal, thereby improving a success rate of demodulating the reflected signal by the receiver.

Further, when this embodiment of this disclosure is applied to a plurality of radio frequency identification systems, on a basis that the energy signal and the control signal of the excitation device are carried via different frequency bands, different excitation devices send control signals via different frequency bands, and the tag can accurately demodulate a control signal based on the frequency bands, thereby improving a success rate of demodulating the control signal by the tag.

The radio frequency identification method in embodiments of this disclosure is described above, and an apparatus in embodiments of this disclosure is described below.

Figure 9:
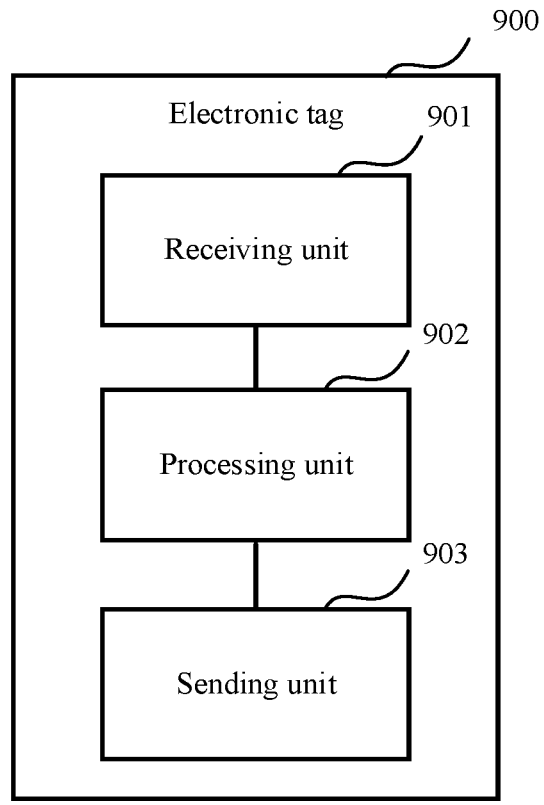
FIG. 9 is a schematic diagram of an electronic tag according to an embodiment of this disclosure.

FIG. 9 is a schematic diagram of an electronic tag 900 according to an embodiment of this disclosure. An embodiment of the electronic tag 900 in this embodiment of this disclosure includes:

a receiving unit 901, configured to receive an energy signal transmitted by a first excitation device via a first frequency band, and receive a control signal transmitted by the first excitation device via a second frequency band, where the first frequency band is different from the second frequency band, the energy signal is for providing excitation energy for the electronic tag, and the excitation energy is for charging the electronic tag;

a processing unit 902, configured to demodulate the control signal from the second frequency band, and modulate, based on the control signal, stored description information for describing a product to a reflected signal, where a frequency band of the reflected signal is the same as the first frequency band; and a sending unit 903, configured to transmit the reflected signal modulated with the description information to a receiver.

In an optional embodiment, the receiving unit 901 is further configured to:

receive, from at least two control signals transmitted by at least two excitation devices and based on a receiving frequency band of the receiving unit, the control signal that is transmitted by the first excitation device and whose frequency band is the same as the receiving frequency band.

In an optional embodiment, the first frequency band includes a radio frequency identification RFID frequency band of 125 KHz, 13.56 MHz, 433 MHz, 800 MHz, 900 MHz, 2.4 GHz, or 5.8 GHz, and the second frequency band includes a frequency band of 125 KHz, 13.56 MHz, 433 MHz, 800 MHz, 900 MHz, 2.4 GHz, or 5.8 GHz.

Figure 10:
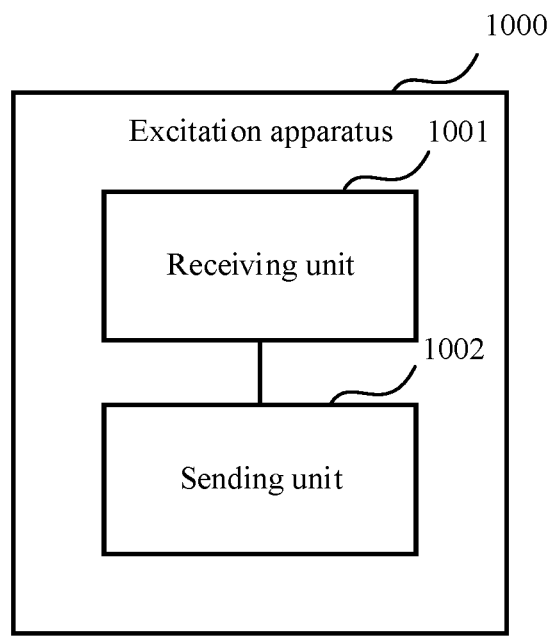
FIG. 10 is a schematic diagram of an excitation apparatus according to an embodiment of this disclosure.

FIG. 10 is a schematic diagram of an excitation apparatus 1000 according to an embodiment of this disclosure. An embodiment of the excitation apparatus 1000 according to this embodiment of this disclosure includes:

a receiving unit 1001, configured to receive a scanning signal from a receiver, where the scanning signal instructs to scan an electronic tag; and a sending unit 1002, configured to transmit an energy signal to the electronic tag via a first frequency band, and transmit a control signal to the electronic tag via a second frequency band, where the first frequency band is different from the second frequency band, the energy signal is for providing excitation energy for the electronic tag, the excitation energy is for charging the electronic tag, the control signal is used for the electronic tag to modulate description information for describing a product to a reflected signal, and the reflected signal is transmitted by the electronic tag to the receiver.

In an optional embodiment, a waveform of the energy signal is different from that of the reflected signal.

In an optional embodiment, the first frequency band includes a radio frequency identification RFID frequency band of 125 KHz, 13.56 MHz, 433 MHz, 800 MHz, 900 MHz, 2.4 GHz, or 5.8 GHz, and the second frequency band includes a frequency band of 125 KHz, 13.56 MHz, 433 MHz, 800 MHz, 900 MHz, 2.4 GHz, or 5.8 GHz.

Figure 11:
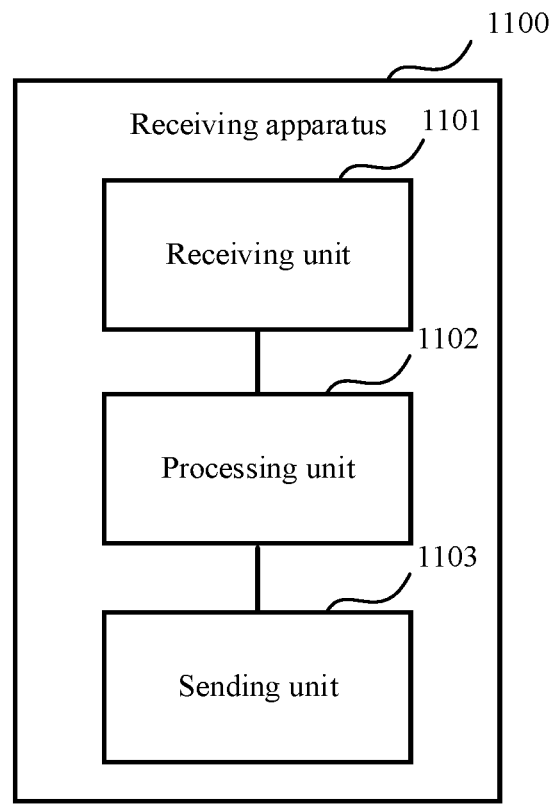
FIG. 11 is a schematic diagram of a receiving apparatus according to an embodiment of this disclosure.

FIG. 11 is a schematic diagram of a receiving apparatus 1100 according to an embodiment of this disclosure. An embodiment of the receiving apparatus 1100 in this embodiment of this disclosure includes:

a sending unit 1103, configured to send a scanning signal to a first excitation device, where the scanning signal instructs to scan an electronic tag; and a receiving unit 1101, configured to receive a reflected signal from the electronic tag, where the reflected signal includes description information that is for describing a product and that is modulated by the electronic tag based on a control signal, the electronic tag is charged by using excitation energy provided by an energy signal transmitted by the first excitation device via a first frequency band, and the control signal is transmitted by the first excitation device to the electronic tag via a second frequency band.

In an optional embodiment, the receiver further includes a processing unit 1102. The processing unit 1102 is configured to identify the reflected signal from a plurality of signals of a same frequency band based on waveforms, where the plurality of signals of a same frequency band include the energy signal transmitted by the first excitation device, and the energy signal and the reflected signal have a same frequency band but different waveforms.

Figure 12:
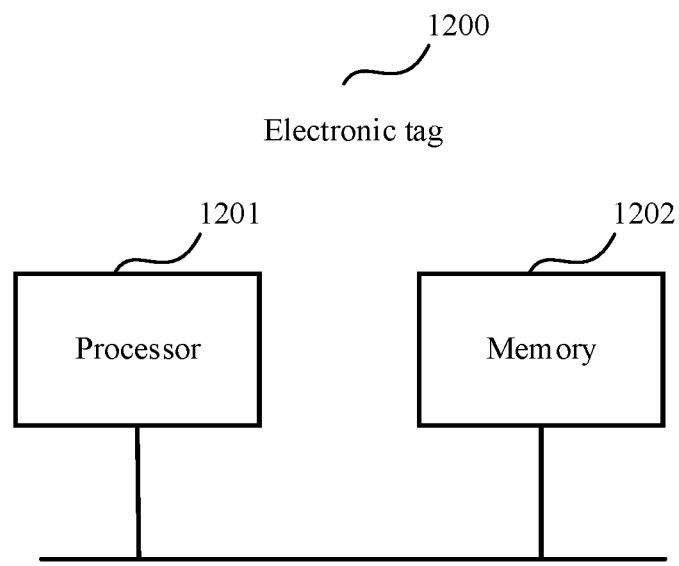
FIG. 12 is a schematic diagram of another electronic tag according to an embodiment of this disclosure.

The following describes, with reference to FIG. 12, a structure of an electronic tag provided in this disclosure. FIG. 12 is an example diagram of a structure of an embodiment of an electronic tag according to this disclosure.

The electronic tag 1200 shown in this embodiment includes a processor 1201 and a memory 1202. The memory 1202 is configured to store program instructions and data.

In this embodiment of this disclosure, the processor 1201 may be a general-purpose processor, a digital signal processor, an application-specific integrated circuit, a field-programmable gate array or another programmable logic device, a discrete gate or transistor logic device, or a discrete hardware component, and may implement or perform the methods, steps, and logic block diagrams disclosed in embodiments of this disclosure. The general-purpose processor may be a microprocessor or any conventional processor or the like. The steps of the methods disclosed with reference to embodiments of this disclosure may be directly performed by a hardware processor, or may be performed by using a combination of hardware and software units in the processor.

Program code executed by the processor 1201 to implement the methods may be stored in the memory 1202. The memory 1202 is coupled to the processor 1201. The coupling in this embodiment of this disclosure may be an indirect coupling or a communication connection between apparatuses, units, or modules in an electrical form, a mechanical form, or another form, and is used for information exchange between the apparatuses, the units, or the modules. The processor 1201 may cooperate with the memory 1202. The memory 1202 may be a non-volatile memory such as a hard disk drive (hard disk drive, HDD), or may be a volatile memory (volatile memory) such as a random-access memory (random-access memory, RAM). The memory 1202 is any other medium that can be used to carry or store expected program code in a form of an instruction or a data structure and that can be accessed by a computer, but is not limited thereto.

Figure 13:
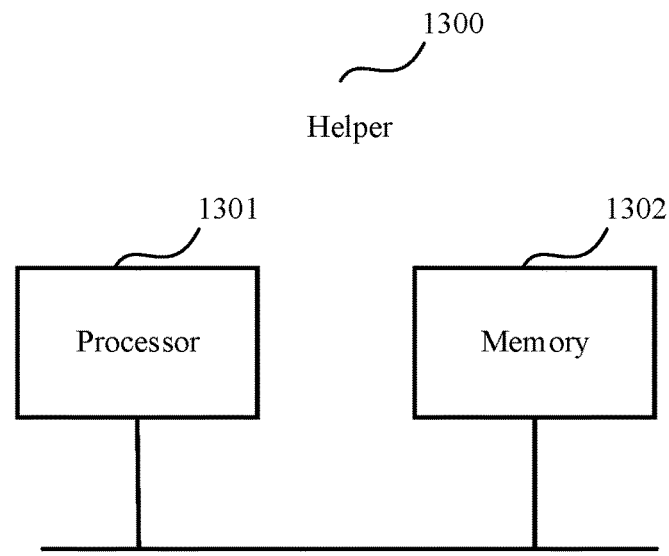
FIG. 13 is a schematic diagram of another excitation device according to an embodiment of this disclosure.

The following describes, with reference to FIG. 13, a structure of an excitation device provided in this disclosure. FIG. 13 is an example diagram of a structure of an embodiment of an excitation device according to this disclosure.

The excitation device 1300 shown in this embodiment includes a processor 1301 and a memory 1302. The memory 1302 is configured to store program instructions and data.

In this embodiment of this disclosure, the processor 1301 may be a general-purpose processor, a digital signal processor, an application-specific integrated circuit, a field-programmable gate array or another programmable logic device, a discrete gate or transistor logic device, or a discrete hardware component, and may implement or perform the methods, steps, and logic block diagrams disclosed in embodiments of this disclosure. The general-purpose processor may be a microprocessor or any conventional processor or the like. The steps of the methods disclosed with reference to embodiments of this disclosure may be directly performed by a hardware processor, or may be performed by using a combination of hardware and software units in the processor.

Program code executed by the processor 1301 to implement the methods may be stored in the memory 1302. The memory 1302 is coupled to the processor 1301. The coupling in this embodiment of this disclosure may be an indirect coupling or a communication connection between apparatuses, units, or modules in an electrical form, a mechanical form, or another form, and is used for information exchange between the apparatuses, the units, or the modules. The processor 1301 may cooperate with the memory 1302. The memory 1302 may be a non-volatile memory such as a hard disk drive (hard disk drive, HDD), or may be a volatile memory (volatile memory) such as a random-access memory (random-access memory, RAM). The memory 1302 is any other medium that can be used to carry or store expected program code in a form of an instruction or a data structure and that can be accessed by a computer, but is not limited thereto.

Figure 14:
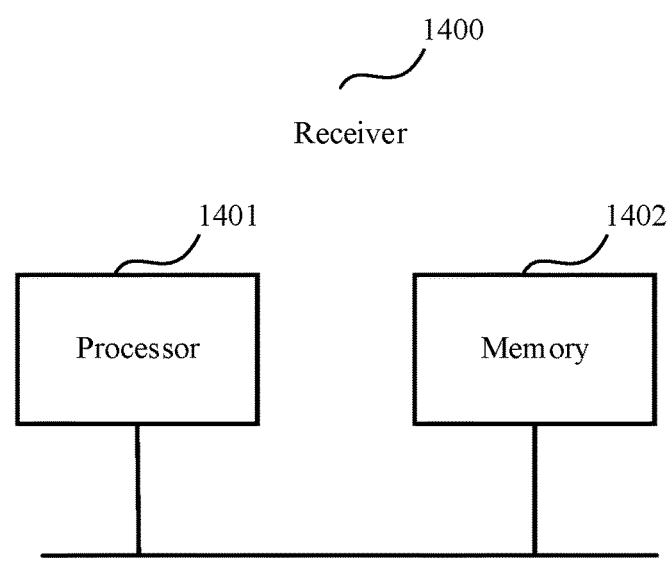
FIG. 14 is a schematic diagram of another receiver according to an embodiment of this disclosure.

The following describes, with reference to FIG. 14, a structure of a receiver provided in this disclosure. FIG. 14 is an example diagram of a structure of an embodiment of a receiver according to this disclosure.

The receiver 1400 shown in this embodiment includes a processor 1401 and a memory 1402. The memory 1402 is configured to store program instructions and data.

In this embodiment of this disclosure, the processor 1401 may be a general-purpose processor, a digital signal processor, an application-specific integrated circuit, a field-programmable gate array or another programmable logic device, a discrete gate or transistor logic device, or a discrete hardware component, and may implement or perform the methods, steps, and logic block diagrams disclosed in embodiments of this disclosure. The general-purpose processor may be a microprocessor or any conventional processor or the like. The steps of the methods disclosed with reference to embodiments of this disclosure may be directly performed by a hardware processor, or may be performed by using a combination of hardware and software units in the processor.

Program code executed by the processor 1401 to implement the methods may be stored in the memory 1402. The memory 1402 is coupled to the processor 1401. The coupling in this embodiment of this disclosure may be an indirect coupling or a communication connection between apparatuses, units, or modules in an electrical form, a mechanical form, or another form, and is used for information exchange between the apparatuses, the units, or the modules. The processor 1401 may cooperate with the memory 1402. The memory 1402 may be a non-volatile memory such as a hard disk drive (hard disk drive, HDD), or may be a volatile memory (volatile memory) such as a random-access memory (random-access memory, RAM). The memory 1402 is any other medium that can be used to carry or store expected program code in a form of an instruction or a data structure and that can be accessed by a computer, but is not limited thereto.

It may be clearly understood by a person skilled in the art that, for the purpose of convenient and brief description, for a detailed working process of the foregoing system, apparatuses, and units, refer to a corresponding process in the foregoing method embodiments, and details are not described herein again.

In the several embodiments provided in this disclosure, it should be understood that the disclosed system, apparatuses, and methods may be implemented in other manners. For example, the described apparatus embodiments are merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (ROM, read-only memory), a random-access memory (RAM, random-access memory), a magnetic disk, or an optical disc.

What is claimed is:

1. A radio frequency identification method, comprising:
    receiving, by an electronic tag, an energy signal transmitted by a first excitation device via a first frequency band to provide excitation energy for charging the electronic tag;
    receiving, by the electronic tag from at least two control signals transmitted by at least two excitation devices and based on a receiving frequency band of the electronic tag, a control signal transmitted by the first excitation device via a second frequency band different from the first frequency band, wherein the control signal is in a same frequency band as the receiving frequency band;
    demodulating, by the electronic tag, the control signal from the second frequency band;
    modulating, by the electronic tag in response to the control signal, description information describing a product to a reflected signal such that the reflected signal is modulated with the description information and has a same frequency band as the first frequency band; and
    transmitting, by the electronic tag to a receiver, the reflected signal modulated with the description information and having same frequency band as the first frequency band.

2. The method of claim 1, wherein the first frequency band comprises a radio frequency identification (RFID)

frequency band of 125 KHz, 13.56 MHz, 433 MHz, 800 MHZ, 900 MHz, 2.4 GHz, or 5.8 GHz, and the second frequency band comprises a frequency band of 125 KHz, 13.56 MHz, 433 MHz, 800 MHZ, 900 MHZ, 2.4 GHz, or 5.8 GHz.

3. The method of claim 1, wherein the reflected signal has a different waveform from that of the energy signal.

4. A radio frequency identification system, comprising an excitation device and an electronic tag, wherein
the excitation device is configured to:
  transmit, to the electronic tag via a first frequency band, an energy signal to provide excitation energy for charging the electronic tag; and
  transmit a first control signal to the electronic tag via a second frequency band different from the first frequency band;
the electronic tag is configured to:
  receive the energy signal via the first frequency band;
  receive, from the first control signal and a second control and based on a receiving frequency band of the electronic tag, a control signal via the second frequency band, wherein the second control signal is transmitted by a second excitation device via a third frequency band different from the second frequency band, and the control signal is in a same frequency band as the receiving frequency band;
  demodulate the control signal from the second frequency band;
  modulate, based on the first control signal, description information describing a product to a reflected signal such that the reflect signal is modulated with the description information and has a same frequency band as the first frequency band; and
  transmit, to a receiver, the reflected signal modulated with the description information and having the same frequency band as the first frequency band.

5. The system of claim 4, wherein a waveform of the energy signal is different from that of the reflected signal.

6. The system of claim 5, wherein the radio frequency identification system further comprises the receiver configured to receive signals including the energy signal and the reflected signal and eliminate the energy signal by using a cancellation algorithm based on the waveform of the energy signal.

7. The system of claim 4, wherein the first frequency band comprises a radio frequency identification (RFID) frequency band of 125 KHz, 13.56 MHz, 433 MHz, 800 MHZ, 900 MHz, 2.4 GHz, or 5.8 GHz, and the second frequency band comprises a frequency band of 125 KHz, 13.56 MHz, 433 MHz, 800 MHZ, 900 MHZ, 2.4 GHz, or 5.8 GHz.

8. The system of claim 4, wherein the excitation device is configured to communicate with the reader via a network connection and receive a radio frequency identification working configuration message from the receiver.

9. The system of claim 4, wherein the excitation device is further configured to receive a scanning signal instructing to scan an electronic tag.

* * * * *